July 26, 1938.   C. E. EVANS   2,124,770
ROPE TYING MACHINE
Filed July 30, 1934   9 Sheets-Sheet 1

INVENTOR
CHARLES E. EVANS
BY
Cook + Robinson
ATTORNEY

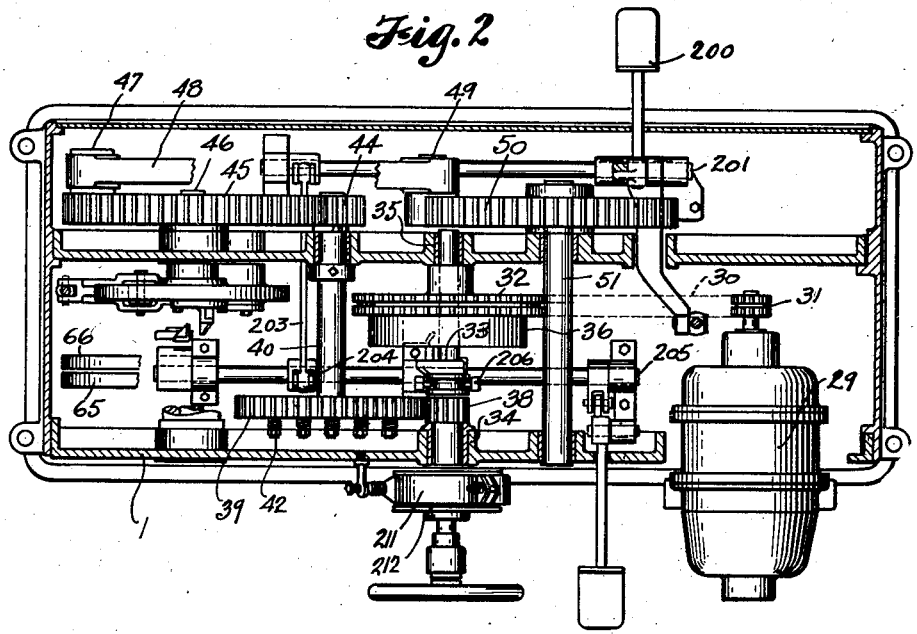
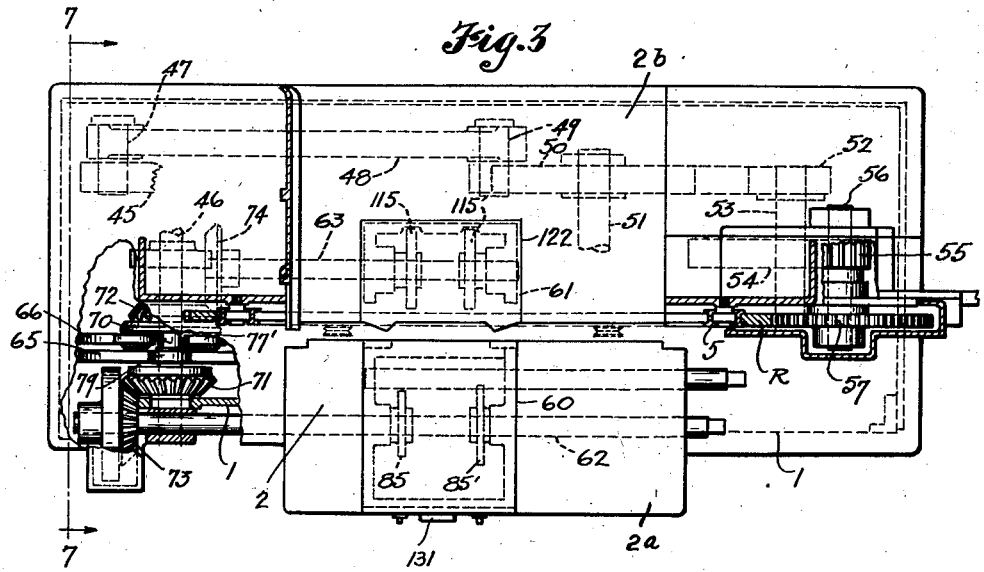
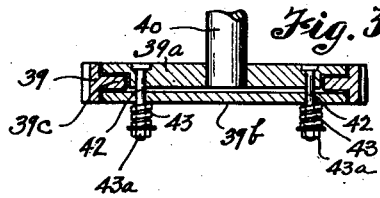

July 26, 1938.　　　　C. E. EVANS　　　　2,124,770
ROPE TYING MACHINE
Filed July 30, 1934　　　9 Sheets-Sheet 3
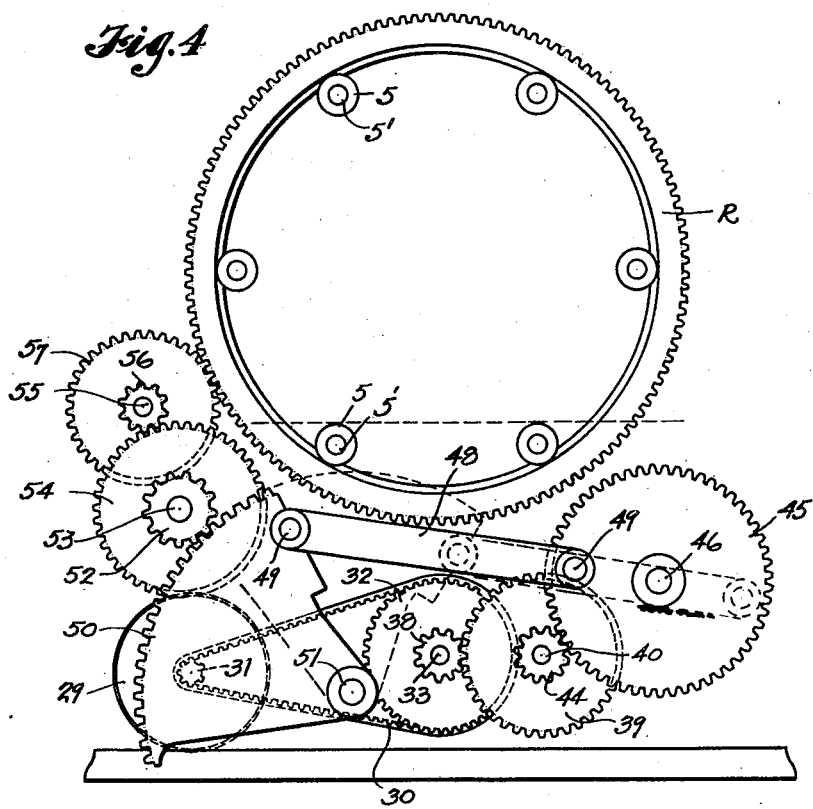
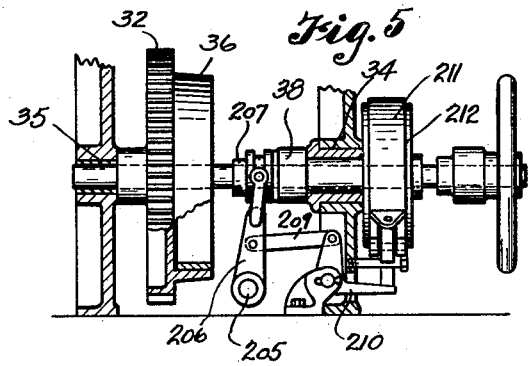
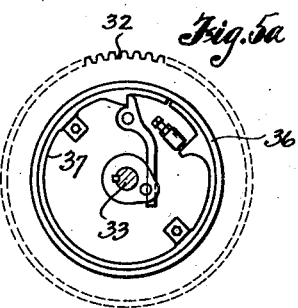
INVENTOR
CHARLES E. EVANS
BY
Cook & Robinson
ATTORNEY July 26, 1938.    C. E. EVANS    2,124,770
ROPE TYING MACHINE
Filed July 30, 1934    9 Sheets-Sheet 4
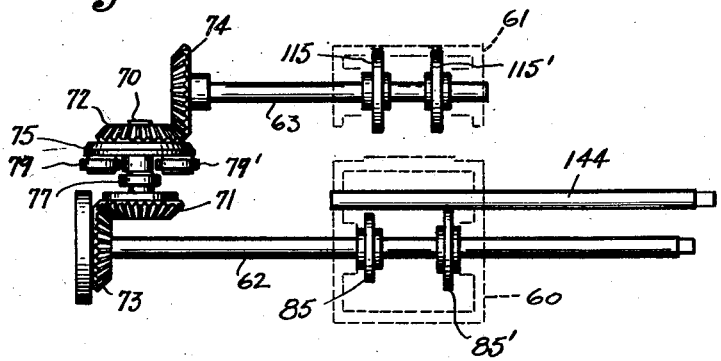
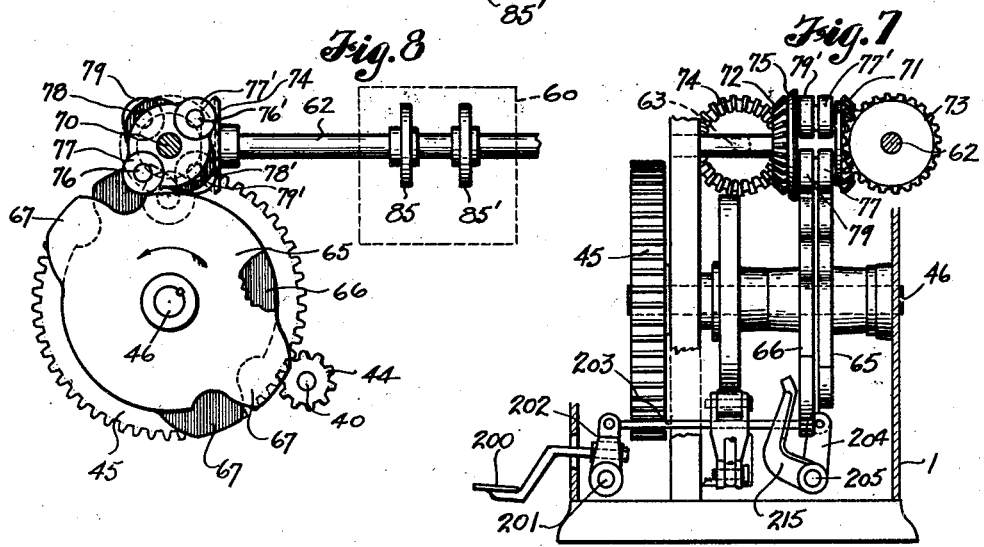
INVENTOR
CHARLES E. EVANS
BY
Cook & Robinson
ATTORNEY

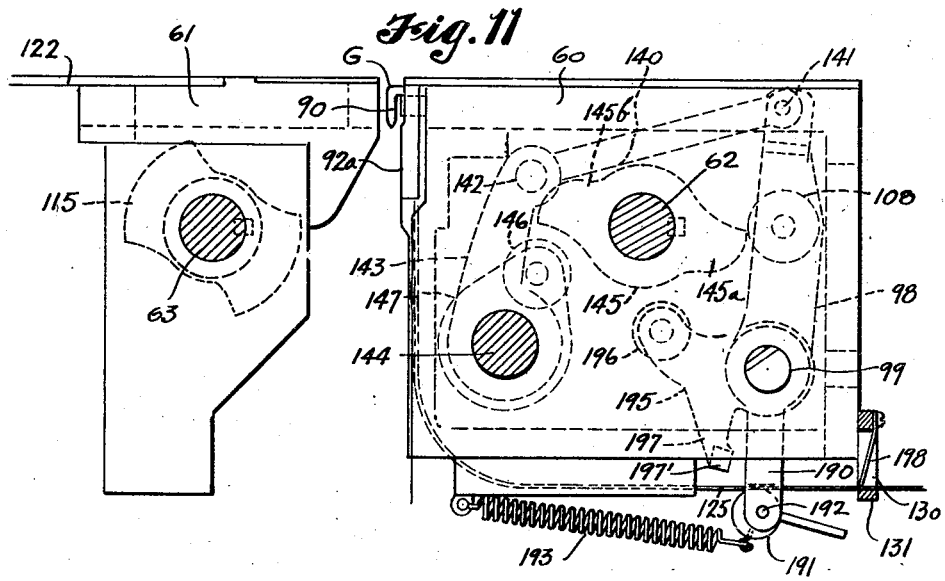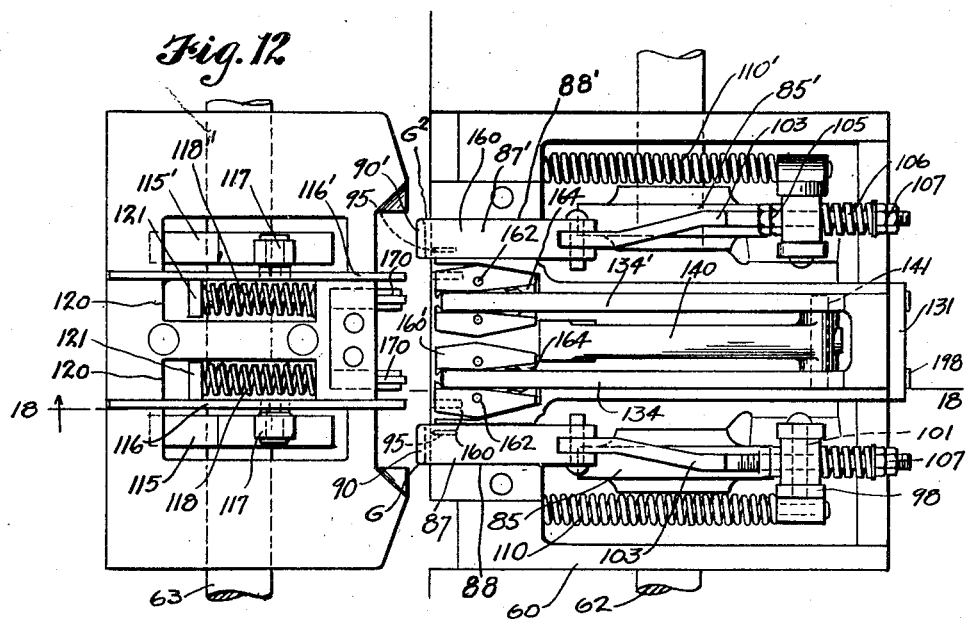

July 26, 1938.　　　C. E. EVANS　　　2,124,770
ROPE TYING MACHINE
Filed July 30, 1934　　　9 Sheets-Sheet 6
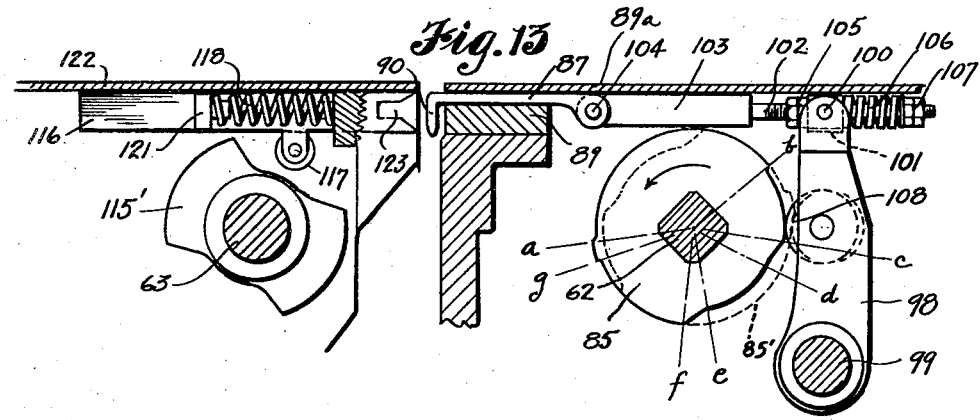
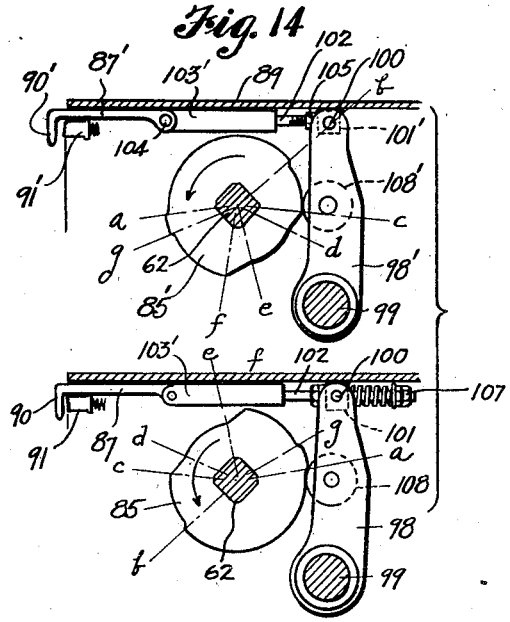
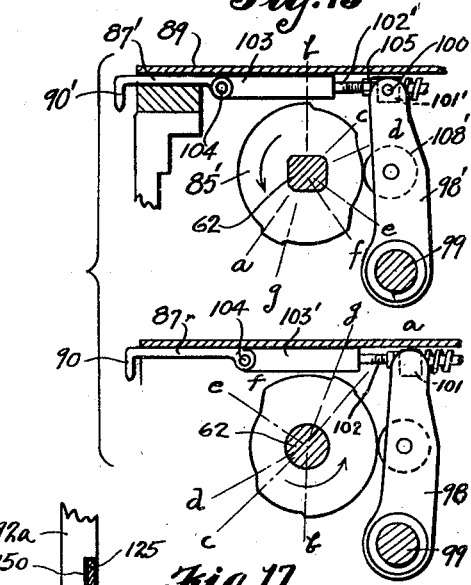
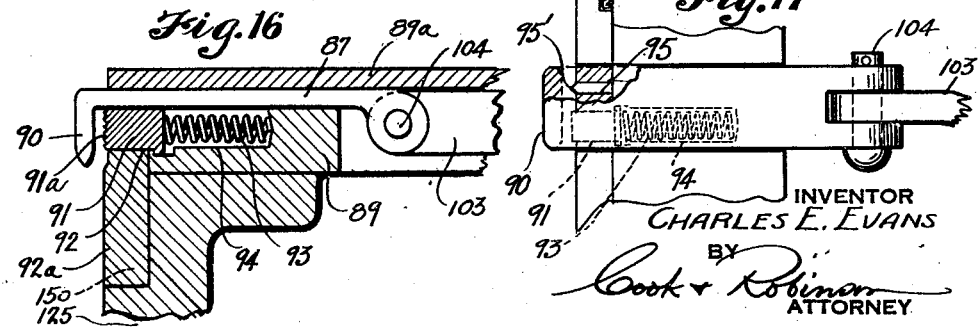
INVENTOR
CHARLES E. EVANS
BY
Cook + Robinson
ATTORNEY July 26, 1938.  C. E. EVANS  2,124,770
ROPE TYING MACHINE
Filed July 30, 1934   9 Sheets-Sheet 7
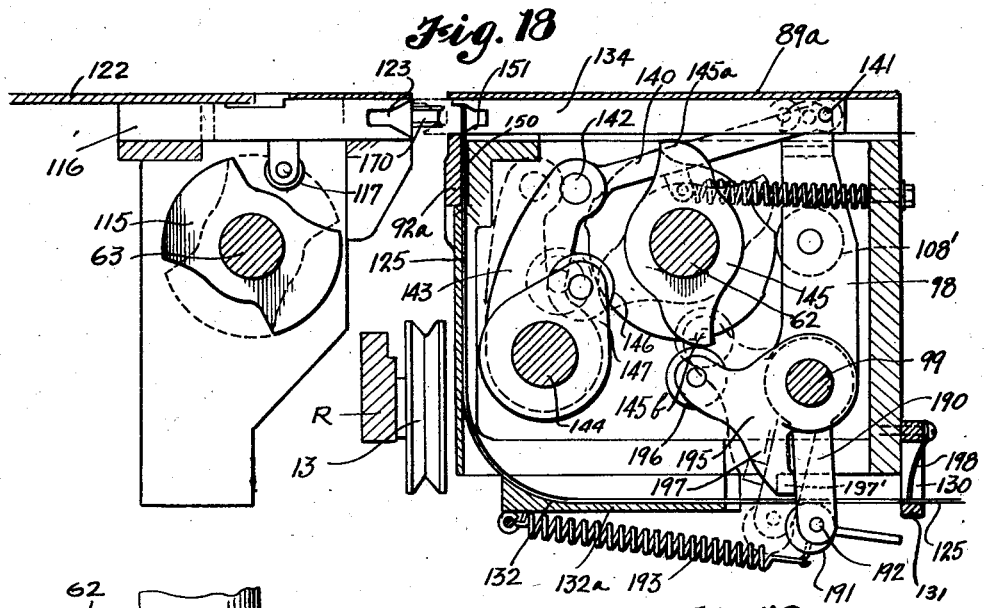
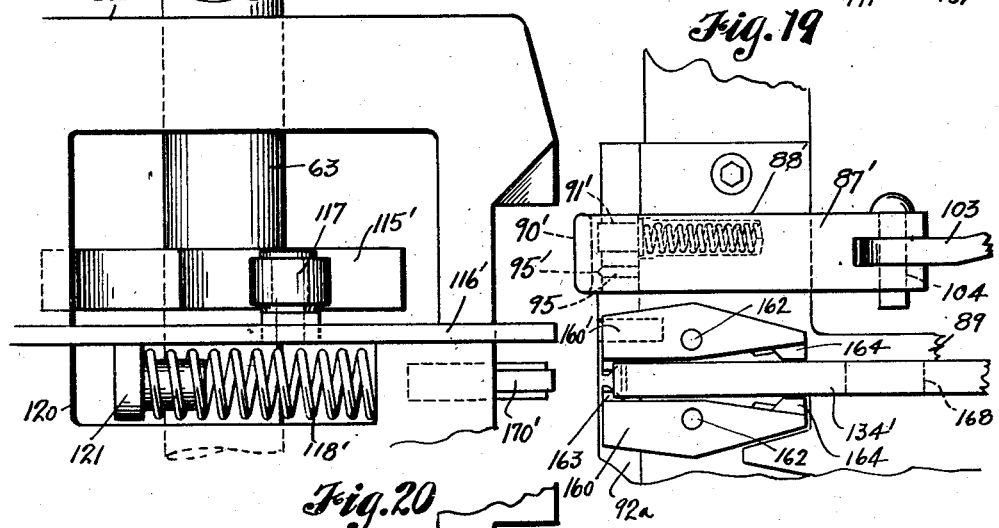
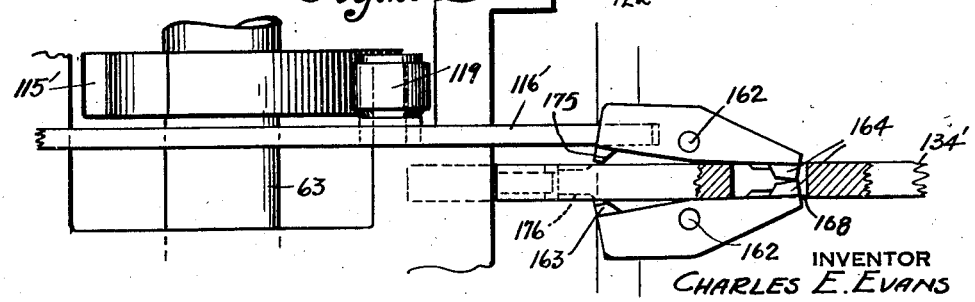
INVENTOR
CHARLES E. EVANS
BY
Cook & Robinson
ATTORNEY

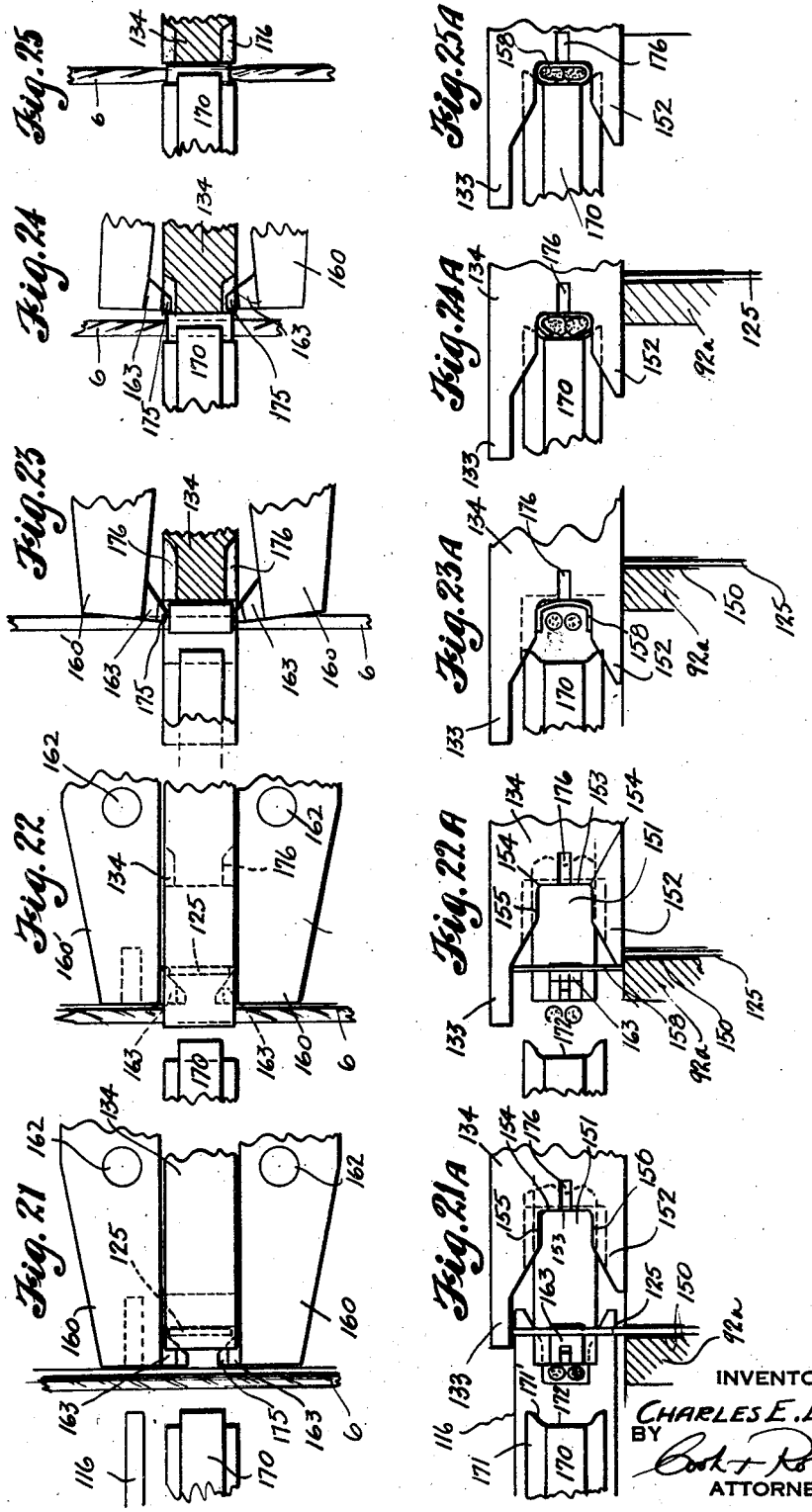

July 26, 1938.  C. E. EVANS  2,124,770
ROPE TYING MACHINE
Filed July 30, 1934    9 Sheets-Sheet 9
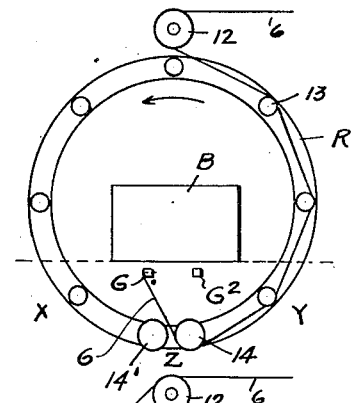
Fig. 26
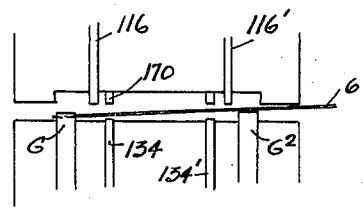
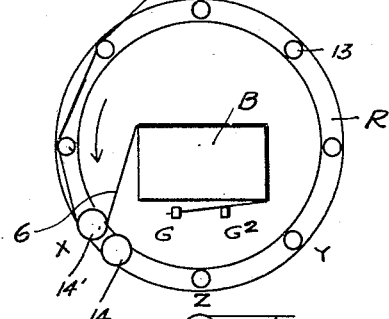
Fig. 27
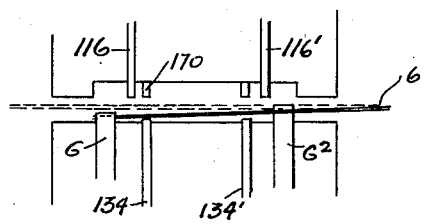
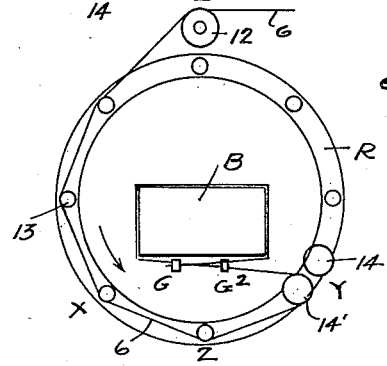
Fig. 28
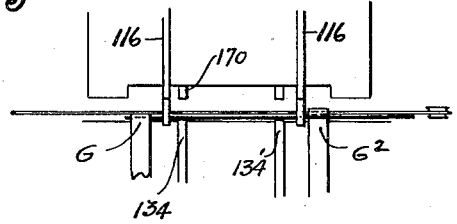
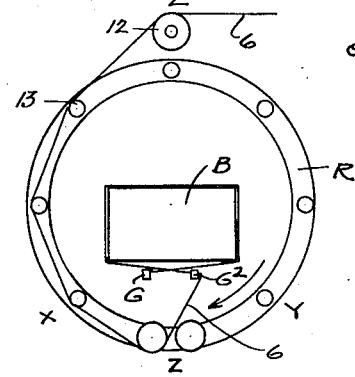
Fig. 29
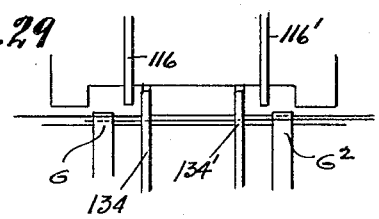
INVENTOR
CHARLES E. EVANS
BY
Cook & Robinson
ATTORNEY Patented July 26, 1938

2,124,770

UNITED STATES PATENT OFFICE 2,124,770

ROPE TYING MACHINE

Charles E. Evans, Seattle, Wash.; Minnie Amanda Evans, owner by decree of distribution Application July 30, 1934, Serial No. 737,518

27 Claims. (Cl. 100—31)

This invention relates to bundle binding machines and more particularly to machines of that character whereby a required length of binding rope, or the like, may be drawn from a supply, wrapped tightly about a package or bundle of limited dimensions with parts thereof brought into overlapped relation and secured together to form a continuous band about the package, then the rope severed adjacent the outside of the point of connection thereby to release the wrapped bundle for removal from the machine while that end of the severed rope leading from the supply remains gripped in the machine, properly threaded and ready for another wrapping operation; this particular invention residing in the construction and adaptation of a rope handling mechanism to machines of the above character, especially that described and illustrated in U. S. Patent to Parker 1,875,260, dated Aug. 30, 1932, or to modifications thereof which were originally designed for the handling of wire or the like.

More specifically stated, it is the object of this invention to provide a bundle wrapping machine comprising mechanism that is automatically operable to wrap a length of rope, or the like, once about a package or bundle, to draw it taut with its ends in overlapped relation, to apply and clinch one or two metal clips or seals about the overlapped ends to join them permanently together and finally to cut the rope at the outside of the seals thereby to release the bundle; it being understood that it is not the intent that the present invention be confined in its use to the machine of the Parker patent but that it may be applied to any type of similar machine having parts coacting substantially as in the Parker patent. It is also an object of this invention to provide a rope gripper mechanism of novel form, comprising paired grippers, one of which is so actuated and controlled as to grip and hold the initial end of the binding rope during the wrapping operation, while the other is so actuated and controlled that it will engage and then grip and hold that portion of the band that is brought into overlapped relation with the initial end properly for the clip applying operation, and will then after the clips are applied, effect the cutting off of the rope at the outside of the clips to free the bundle but will still retain its hold on the end of the rope leading from the supply, preparatory to a following wrapping operation which will take place in a reverse direction.

Still further objects of the invention reside in the details of construction and mode of operation of the various parts designed for bringing the overlapped portions of the binding rope into proper relationship with each other and with the clip applying and clinching devices for the application of the clips thereto.

It is also an object of the invention to provide means in the machine for the preparation of the clips from metal strips fed from sources of supply into the machine and to provide automatic means whereby the supply strips are advanced to the clip formers in accordance with the requirement therefor.

Other objects of the invention reside in the details of construction of the grippers; clip formers; clinching devices strippers and all parts coacting therewith for the automatic carrying out of bundle wrapping operations.

In accomplishing these and other objects of the invention, I have provided the improved details of construction, the preferred forms of which are illustrated in the accompanying drawings, wherein—

Fig. 2 is a sectional view thereof in a horizontal plane, substantially on the line 2—2 in Fig. 1.

Fig. 3 is a sectional view in the horizontal plane of line 3—3 in Fig. 1.

Fig. 3A is a sectional detail of the friction drive connection.

Fig. 4 is a diagram of the gear train, as seen from the rear of the machine.

Fig. 5 is a cross section on line 5—5 in Fig. 1, illustrating the clutch and brake control means.

Fig. 5A is a detail of the clutch device.

Fig. 6 is a view in a horizontal plane, illustrating the driving gearing for functionally actuating the grippers and the clip forming and applying devices.

Fig. 7 is a side elevation of the driving mechanism, as seen on line 7—7 in Fig. 3.

Figs. 8, 9 and 10 are views in which successive positions of the driving cams for the clip applying devices, grippers and associated devices, are shown.

Fig. 11 is a side elevation showing relationship of the housings for the rope register mechanism and for the gripper and clip forming devices; also illustrating location of the rope register slides in one of the housings and in the other housing, illustrating location of the gripper actuating means and the clip cutting and applying devices.

Fig. 12 is a top view of the same parts with the cover plates removed from the housings for better illustration of the enclosed mechanisms.

Fig. 13 is a sectional detail, showing in side elevation, one of the rope grippers and its actuating cam, also showing its companion cam for actuating a rope registering slide whereby overlapped parts of the binding rope are alined for reception of the attaching clips.

Fig. 14 is a view diagrammatically showing relative positions of the pair of grippers and their actuating cams at the start of a wrapping operation.

Fig. 15 is a similar view showing the extended position of one of the grippers to receive the rope thereunder after it has been wrapped about a package.

Fig. 16 is a sectional detail, in vertical plane, of a gripper mechanism.

Fig. 17 is a top view of the same showing the location of the rope cutter beneath the gripper hook.

Fig. 18 is a cross section on line 18—18 in Fig. 12, showing at one side, the rope register slides and at the other side the mechanisms for actuating the grippers, the clip cutter slides, and the metal band feed mechanisms.

Fig. 19 is an enlarged, top view of a rope register assembly, and opposite thereto showing the complemental, gripper and clip forming and applying slide.

Fig. 20 is a similar view showing the clips applying slide in extended position.

Figs. 21, 22, 23, 24 and 25 are views, showing in plan, the successive positions of the clip cutter slide and associated parts during the applying of seals or clips to the overlapped ends of a binding rope applied about a package.

Figs. 21A, 22A, 23A, 24A and 25A are views in side elevation of the parts as shown in Figs. 21 to 25, respectively.

Fig. 26 is a view diagrammatically illustrating the position of the rope and wrapping gear at the start of a wrapping operation, and adjacent thereto showing in plan, the relative positions of grippers, the rope registering slides, and clip cutting and forming bars.

Figs. 27, 28 and 29 are similar views of the same parts, in their relative positions during the wrapping operation.

Figure 1:
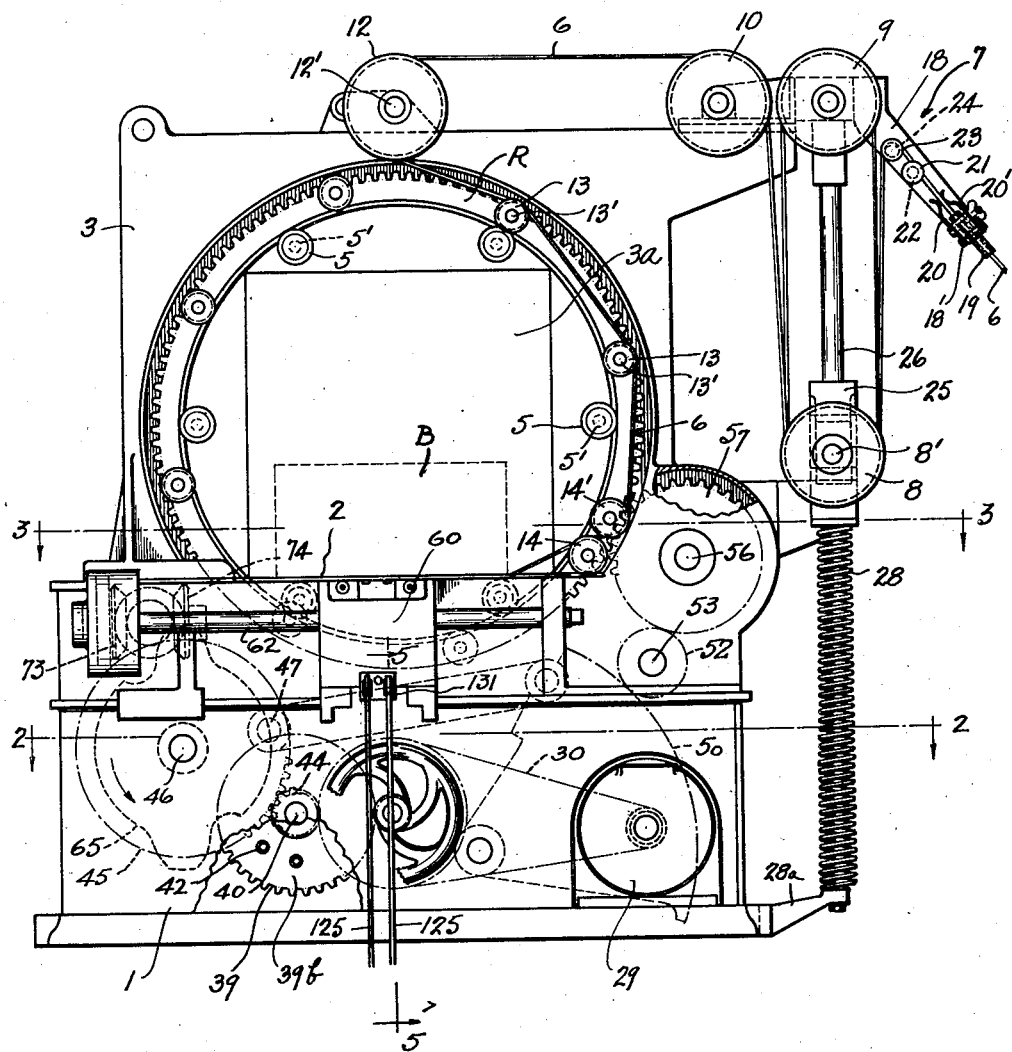
Fig. 1 is a front elevation of a bundle binding machine embodying the present invention.

It will be explained that the present invention, as herein illustrated, utilizes a major portion of the machine of the previously mentioned Parker patent, which machine is designed for the wrapping of bundles with wire, and which operates to wrap a wire band about a package, to bring opposite ends of the wire into overlapped relation and to twist them together in a flat knot. The present machine is designed to use rope, or the like, in lieu of wire, in a similar way, but the ends of rope are thereby overlapped and then permanently joined by the clinching of metal seals about the overlapped ends. A feature of this invention resides in the provision of a unitary mechanism adapted to be easily and readily substituted in the machine of the Parker patent, for the wire grippers, knotter and cutters, as used therein, thereby to convert a wire handling machine into a rope handling machine.

Briefly described, the present machine embodies mechanism operable to draw off a required length of rope from a spool, to wrap it tightly about a bundle with portions overlapped, then to register and unite the overlapped portions of the rope by the clinching of metal clips or seals thereabout. Like the machine of the Parker patent, the direction of wrapping is reversed with each successive operation. Preparatory to a wrapping operation, the binding rope is threaded through suitable tensioning means, over slack take up sheaves, about guides on the wrapping element which is in the form of a ring gear that encircles the bundle to be wrapped, and the free end of the rope secured in a relatively stationary gripper. The ring gear, incident to rotation, pays out the rope therefrom, as drawn from the supply, and wraps it tightly once about the bundle. The extent of travel of the ring is such as to carry the rope to a position at which a portion thereof will be overlapped with a short length adjacent the initially gripped end; then, after certain devices have operated to register the overlapped portions of the rope closely together within the line of travel of the clip applying means and the rope leading to the supply has been engaged by a second gripper, other devices operate to apply the clips to secure the band. Following the application of clips to the overlapped end of the band, the first gripper releases its hold on the initial end of the rope and the second gripper is moved against a cutter in a manner to cut the rope thereunder to release the bundle, but to retain its hold on the rope end leading to the supply, preparatory to a subsequent wrapping operation for which the direction of rotation of the ring gear is reversed.

The machine is manually set in motion for each wrapping operation but is automatically stopped when that operation is completed.

Referring more in detail to the drawings—

The present machine, in a preferred form of construction, comprises a base housing 1 containing the driving mechanism. This housing is covered by a horizontal top, or table 2, on which the bundle or package to be wrapped, is placed; such a bundle being designated by reference character B in Fig. 1. An upper frame structure 3 is mounted rigidly upon the base housing and extends substantially above the table 2. This frame is provided with a large opening 3a within which a bundle to be wrapped is located, and, if such is desired, clamping devices, not herein shown, may be provided on this frame for centering and retaining the bundle in position during the wrapping operation.

Supported by the frame structure 3 in a position encircling the opening 3a and the bundle located therein, is a ring gear R rotatably mounted by a plurality of equally spaced, grooved rollers 5, revoluble on studs 5' that are fixed in the frame structure. The ring gear R passes, as shown in Fig. 1, below the horizontal plane of the table top.

In accordance with the operation of this machine, a rope 6 is drawn from a supply spool, not shown, is then threaded through tension producing means, designated in its entirety in Fig. 1 by numeral 7, then is wrapped several times about slack take up sheaves 8 and 9, then extended across a guide sheave 10, and from the latter is passed first over a guide 12 mounted by a stud 12' fixed in the frame 3 centrally over the ring gear R, then onto the ring gear about grooved guide rollers 13 that are mounted thereon at regularly spaced intervals by studs 13', then threaded inwardly between two grooved guide rollers 14—14', mounted on the ring in close relation to one of a pair of spaced gripping devices that are located beneath the horizontal plane of the table and adjacent the vertical plane of the rope as applied about the bundle by the ring gear; these grippers are for easy reference designated in their entireties respectively by reference characters G and G². The operating arrangement of the various devices is such that upon rotation of the ring gear R the rope 6, held at its initial end by the gripper G closely beneath the bundle, will be drawn from the supply and will be fed from between the rollers 14—14', as the ring gear rotates, thereby to be tightly wrapped about the bundle. It is to be understood that the extent of rotation of the ring gear R is such that a portion of the rope, after passing about the bundle, is brought into overlapped relation with the initial end portion held in the gripper G and is applied to the gripper G² to be held therein for the registering and clip applying operation, described more fully later on, and the next wrapping operation which takes place is in a reverse direction with the initial end of the rope held by gripper G².

The table top comprises two sections 2a and 2b spaced apart but lying in the same horizontal plane, as seen in Fig. 3, thereby providing an open space between them, substantially in the plane of the binding rope as carried on the ring gear, thereby to permit the passage of the rope about the bundle which, for wrapping, is placed on the table across this open space.

The grippers G and G² are located closely beneath the table, symmetrically spaced at opposite sides of the vertical plane of the axis of rotation of the ring gear R. Since the ring gear R, in each cycle of operation is caused to rotate approximately forty-five degrees more than one complete circle, then back to starting point, it is apparent that starting with one end of the rope held in the gripper G, and the sheaves 14—14' at the lower side of the ring, as in Fig. 26, and the ring rotated through one cycle in a counterclockwise direction, the rope will be wrapped once about the bundle, and drawn taut with parts in overlapped relation, as it reaches the position of Fig. 28, at which the second gripper G² takes hold prior to the ring reversing and moving back to starting position. Then for the next cycle of operation, the ring gear will be rotated to the same extent, starting clockwise while the initial end of the rope is held in gripper G².

Before describing in detail the clip applying and rope cutting devices, I will describe the rope tensioning means, the ring gear driving means and control devices in order that a better understanding of the mechanism of the present invention will be had.

The rope tensioning means, designated in its entirety by numeral 7 comprises a bracket 18 that is rigidly fixed to the upper portion of frame 3 at one side thereof, to extend laterally and downwardly, as shown in Fig. 1. At the lower end of the bracket is a forwardly turned end portion 18' in which a short length of tube 19 is mounted. The rope 6 is threaded upwardly through this tube and in passing therefrom is frictionally gripped between the ends of a pair of yieldable clamp plates 20—20' that are fixed to the bracket end 18'. Also mounted on the bracket is a grooved snubbing roll 21, rigidly mounted by a stud bolt 22 and adjacent thereto is a grooved sheave 23 rotatably mounted by a stud 24. After passing from between the ends of the two clamp plates, the rope 6 is wound several times about the snubbing roll 21 and is then wrapped once about the sheave 23, then is looped several times about the two take up rolls 8 and 9 and from the latter is drawn over the sheaves 10 and 12, then about the guide sheaves 13 on the ring gear R and is finally threaded inwardly between the guide sheaves 14—14' and at its end is held in one or the other of the grippers G or G².

The take up roller 8 is mounted on a stud 8' fixed in a head block 25 that is slidably keyed for travel toward and from the sheave 9 along a vertically fixed guide rod 26. A coiled spring 28 is attached at one end to the block 25 and, at its other end is fixed to an arm 28a extending from the base of the housing 1; thereby to yieldingly maintain the sheaves 8 and 9 at such spaced relation that slack in the rope occurring incident to the reversing operations of the ring will be taken up and it will be maintained taut at all times.

The mechanisms for rotatably operating the ring gear R and for controlling the operations of the rope registers, the two grippers and those devices for forming and applying the clips or seals and for finally cutting the rope to release the bound bundle are contained within the housing 1. The driving power or motive means for the mechanism consists of an electric motor 29 operatively connected by a chain belt 30 that extends over the motor shaft driving sprocket 31, with a clutch sprocket wheel 32 that is revoluble on a horizontal shaft 33, which, in turn, is revolubly supported, as seen in Fig. 5, in bearings 34 and 35 in the front and rear walls of the housing 1. A drum flange 36 is formed concentrically on the clutch sprocket wheel 32, and contained therein is a friction clutch device 37 whereby a driving connection may be made between the sprocket 32 and shaft 33 when the clutch is engaged, thus to transmit power to the drive mechanism. When the machine is out of gear, the clutch is disengaged and the sprocket 32 runs freely on shaft 33. A pinion gear 38 is keyed on shaft 33 and this meshes with a larger gear 39 that is frictionally secured on the forward end portion of a horizontal shaft 40 revolubly supported in the frame structure, as seen in Fig. 2. The friction means, as shown in Fig. 3A, comprises a wheel hub portion 39a fixed on shaft 40 and a friction disk 39b coaxial therewith and supported by a plurality of studs 42 that are fixed in and extend from the hub portion 39a through openings provided therefor on the disk. The disk is yieldingly clamped against an annular, mounting flange 39c of the gear 39 which is disposed between the peripheries of the hub disk 39a and disk 39b by coiled springs 43 that surround the outer end portions of the studs 42 and which are held thereon by nuts 43a.

On the rearward end of shaft 40 is keyed a pinion gear 44 in driving mesh with a larger gear wheel 45 fixed on a shaft 46 that is revolubly supported in the housing 1. The gear wheel 45 has a stud 47 fixed eccentrically therein on which stud one end of a link 48 is pivotally mounted; the opposite end of the link being pivotally mounted on a stud 49 that is fixed eccentrically to a gear sector 50 supported by a concentric shaft 51 mounted in the lower part of the main housing, as seen in Fig. 2. This link connection provides that on rotation of the gear 45, the sector 50 will be oscillated between the limits in which it is shown in full and dotted lines in Fig. 4.

Meshing at all times with the gear sector 50 is a gear pinion 52 keyed on a shaft 53 horizontally supported in the frame structure. On the forward end of shaft 53 is a larger gear 54 which drives a pinion gear 55 on a shaft 56, at the left hand side of the housing, as seen in Fig. 4, and on which latter shaft 56 is a gear 57 which meshes with and drives the ring gear R. It is to be understood that the gear ratio of the train of gears between the gear sector 50 and ring gear R is such as to produce an increase whereby the limited movement of the sector will cause the extended rotary travel of the ring gear R required for each wrapping operation. It is also to be understood that the oscillating action of the sector 58 produces the reverse operations of the ring gear R.

The grippers, their actuating mechanisms, the clip formers, and parts directly associated therewith, are contained in a box or housing 60, located below and at one side of rope passing slot in the table top, as shown in Figs. 11 and 12, and the rope registering slides and their actuating cams are contained in a housing 61 at the under side of the table top at the opposite side of the slot. Drive shafts 62 and 63 enter these housings, respectively from the left hand side, as seen in Fig. 6, and these shafts are rotatably actuated in proper timing with the gear R by a master cam mechanism on shaft 46, as shown best in Figs. 1, 3 and 6 to 10, inclusive. The shaft 46 rotates at all times in the same direction regardless of reverse operation of ring gear R.

As will be observed by reference to Figs. 1 and 8, a pair of cams 65 and 66 are keyed on the forward end of the revolubly driven shaft 46. These cams are spaced apart on the shaft and each has diametrically opposite, peripheral surfaces of substantially equal extent concentric of the shaft. Also, the cams are each provided at diametrically opposite sides with extended lobes 67, and, as seen in Figs. 8 to 10, the cam 65 is set slightly in advance of the cam 66.

Mounted parallel with and directly above the cam supporting shaft 46, is a shaft 70 that is revolubly supported in frame bearings. Fixed on this shaft are oppositely facing, spaced bevel gears 71 and 72. The gear 71 is in driving mesh with a bevel gear 73 keyed on shaft 62, and gear 72 is likewise in driving mesh with a bevel gear 74 keyed on shaft 63. These bevel gears are all of the same size and therefore will rotate in unison. While shaft 46 rotates continuously during each wrapping operation, the shaft 70 is revolved intermittently under influence of the rotating cams 65 and 66 by means which will now be described.

Secured to the back of gear wheel 72 is a plate or disk 75 and fixed therein, at equal distances from the shaft 70 are two pins 78—78' spaced diametrically opposite each other, and on which are rollers 79—79'. Two pins 76—76' are secured to the back of the gear 71 on which are rollers 77—77'. Both pairs of pins are extended in such manner that the rollers of the different pairs will lie in spaced planes and in such position that they may be engaged, respectively, by the cams 65 and 66 which are spaced accordingly on shaft 46.

It is to be observed, by reference to Figs. 7, 8 and 9, that the shape of the cam lobes 67 is such that as the cams revolve in the direction of the arrow, the lobes thereon will so engage the rollers 77—77' and 79—79' as to impart rotary motion to the shaft 70, similar to the action of spur gears except that the shaft 70 is gradually started from its position of rest and accelerated to maximum speed and again gradually decelerated until it comes to rest. The passing of the lobes at one side of the two cams is designed to cause a one-half turn of shaft 70 and while concentric portions of the cams are in contact with certain of the rollers, after each advance operation, the shaft 70 is held at rest.

The timing of rotation of shaft 70 under influence of the two cams is such that it is at rest during rotation of the ring gear R in a counterclockwise direction, as observed in Fig. 26, from the start of a wrapping operation until the two sheaves 14—14' on the ring gear paying out the rope attached in gripper G have once encircled the package and have again reached a point directly below the axis of rotation, as designated at station Z in Fig. 26 whereupon the two lobes at one side of the cams 65—66 come into play and the shaft 70 is rotated one hundred eighty degrees, during which time the ring gear carries the sheaves 14—14' to the limit of movement, as shown in Fig. 28, to the station Y thus to apply the rope to gripper G², whereupon, the direction of rotation of ring R reverses and moves the sheaves 14—14' back to station Z as in Fig. 29 at which time the entire machine is brought to rest by the automatic disengagement of the main drive clutch. Likewise, the shaft 70 is at rest during clockwise wrapping operations of the ring gear R from the start of an operation until the sheaves 14—14', after once encircling the package again reach the station Z, at which time the other two lobes of the cams act on the rollers to rotate the shaft 70 another one hundred eighty degrees during which time the ring gear R advances the sheaves 14—14' from station Z to station X and then reverses and carries them back to station Z at which location the machine is automatically stopped by disengagement of the main clutch.

From the above it will be quite apparent that the shafts 62 and 63, connected by the bevel gears with shaft 70, as seen in Fig. 6, will be rotatably advanced one-half turn always in the same direction during the final wrapping movement of the ring gear R in either direction, thus to actuate those mechanisms in housing 61 to register the overlapped ends of the rope after encircling the bundle and to actuate those mechanisms in housing 60 for applying the clips and finally to sever the end of the rope leading to the supply to release the bundle for removal from the machine.

The shaft 62 extends transversely through the housing 60, as seen in Figs. 6 and 11, and fixed thereon, within the housing and in spaced relation, are two cams 85—85', whereby the grippers, G and G² are actuated. These grippers comprise horizontally disposed bars 87 and 87' mounted for longitudinal, slidable movement in guide slots 88 and 88' provided therefor in the top surface of a horizontal frame 89 that is applied across the top of the housing 60, as seen in Fig. 12. The two bars are spaced apart, symmetrically at opposite sides of the vertical axial plane of the ring gear R, and are held in place in their guideways by a cover plate 89a that is applied over the housing and forms a part of the table top. The gripper bars 87—87' are formed at their outer ends, respectively, with downturned gripper hook portions 90 and 90' adapted to coact, when the gripper bars are actuated inwardly to certain positions, with inwardly yieldable gripper plungers 91 and 91' that are movably mounted in bored sockets 92 in plate 92a applied to the inner face of the housing 60, as seen in Fig. 16, thereby to grip and hold the overlapped end portions of the binding rope during the clip applying operation.

By reference to Figs. 16 and 17, it will be observed that each of the gripper plungers 91—91' has a flat, knurled outer end surface 91a projecting slightly beyond the surface of the plate 92a and that coiled springs 93 are contained in chambers 94 in the frame member 89 back of the plungers to urge the latter outwardly to oppose the inward gripping pressure of the gripper hooks 90—90'. Also, it will be observed that spaced inwardly from each gripper plunger, is a cutter plate 95 mounted solidly in the end of the top frame 89, and these cutters have sharpened outer ends 95' projecting in opposed relation to the inner surfaces of the gripper hooks, as seen in Fig. 17.

In Fig. 13 is shown the gripper bar 87 and its actuating cam 85, and in dotted lines is shown the position of the cam 85' for actuating the gripper bar 87'. It is noted that these two cams are alike in form but one is advanced an interval of one hundred and eighty degrees relative to the other so that they will operate the gripper bars alternately for the successive wrapping operations of the ring gear R. It is also understood that the shaft 62 on which these cams are fixed, rotates one-half turn for each wrapping operation.

The operating connection between the gripper bars 87—87' and their respective cams is as follows:

Associated with the cams 85—85', respectively, are cam actuated levers 98 and 98', pivotally supported at their lower ends on a cross shaft 99 fixed in opposite side walls of the housing 60, and they are pivotally connected at their upper ends, as at 100, with blocks 101—101' which are slidable on threaded end shanks 102—102' of bars 103—103' which in turn are connected pivotally at their forward ends, as at 104, with the inner ends of the gripper bars 87 and 87'. The blocks 101—101' are adjusted to and set at definite positions on the shanks between lock nuts 105 at their inner sides and yieldable coiled springs 106 at their outer ends; which springs are held under compression on the shanks by nuts 107, as seen in Fig. 13. Mounted on the levers 98—98', respectively, are cam following rollers 108 and 108' through the mediacy of which the levers are actuated as the cams 85—85' revolve, to shift the gripper bars inwardly or outwardly, and the rollers are held against their respective cams and the levers are pulled inwardly by means of coiled springs 110—110' which have ends attached, as shown in Fig. 12, to the forward wall of the housing 60 and their other ends attached to lateral bosses on the upper ends of the levers.

Each cam, 85—85' is provided with a concentric surface extending approximately one hundred and fifty degrees between the radial lines $a$ and $b$, shown in Fig. 13, then, continuing therefrom opposite to the direction of rotation of the cam which is designated by the arrow thereon, is a concentric surface of lesser radius and of approximately thirty-five degrees extent between the radial lines, $b$ and $c$. This latter surface merges through an angle of approximately twenty-two degrees into a concentric surface of still shorter radius extending between radial lines $d$ and $e$ that subtends an arc of approximately fifty-five degrees; this surface merges through an arc of sixteen degrees into a concentric surface of a radius equal to that between radial lines $a$ and $b$ and which subtends an arc of approximately sixty-two degrees between the radial lines $f$ and $g$. Between radial lines $g$ and $a$ is a concentric surface extending along an arc of about ten degrees, of a radius slightly greater than that first mentioned; for purpose of explanation, these various cam surfaces will be designated by the radial lines between which they are confined.

With the cam so constructed, it is readily apparent that starting with it in the position of Fig. 13 and rotating counterclockwise, the cam roller will first pass from surface $b$—$c$ through the incline $c$—$d$ and onto surface $d$—$e$, thereby causing the gripper bar to be extended from "loosen" position to "rope catch" position; this being the position of extension for catching the rope end after the rope has been once wrapped about the bundle. Then, it is apparent that as the cam continues to rotate, the cam follower moves up surface $e$—$f$ and onto "grip" surface $f$—$g$ which causes it to grip and hold the rope. Finally the cam follower moves across the "cut" surface $g$—$a$ and in so doing pulls the grip bar hook inwardly and tightly against the sharp cutting edge of the underlying cutter thereby to sever the supply rope from the bundle; however, the end of the supply rope is still held between the gripper hook and the underlying plunger. As the cam follower passes from the "cut" surface of the cam it moves again onto the "grip" surface $a$—$b$, as seen in the lower portion of Fig. 14. During the following wrapping operation, this gripper remains stationary in "grip" position until near the end of the operation where the cam follower rides onto "loosen" surface $b$—$c$, to release this end of the rope.

Refer now to Figs. 14 and 26. Assuming that the end of a binding rope has been threaded to the machine and extended about the sheaves 13 of the ring gear between sheaves 14—14', and is gripped at its end beneath the gripper hook 90 which hook is then held in gripping position by reason of the cam roller of lever 98 resting against the concentric "grip" surface $a$—$b$ of cam 85, while the gripper hook 90' of grip bar 87' is in "loosen" position by reason of its cam roller 108' resting against the concentric portion $b$—$c$ of cam 85', then assuming that the ring gear R rotating counterclockwise carries the rope about the bundle and brings it into overlapped relation with the initial end; the shaft 62, as previously stated, will be set in motion during the latter period of travel of the ring R and will cause the cams 85 and 85' to revolve in the direction of the arrow, Fig. 14, through an interval of one hundred and eighty degrees.

At the start of the counterclockwise rotation of ring gear R, and until the initial end of the rope has been carried past the gripper hook 90' of grip bar 87', the latter is held sufficiently retracted, by reason of its corresponding cam roller riding on the "loosen" surface $b$—$c$ of cam 85' that the rope will not be caught thereby; however, after the rope has passed this gripper and has been drawn up against the bottom of the package being wrapped, as seen in Fig. 27, the grip bar 87' is extended to "catch" position by reason of its corresponding cam roller 108' passing onto the cam surface $d$—$e$ of cam 85', as seen in Fig. 15; then the rope, after being once wrapped about the bundle, will be brought up between the end hook 90' and the gripper plunger 91. Whereupon, the cam roller in passing onto the "grip" surface $f$—$g$ of the cam 85' pulls the grip bar inwardly and the rope is gripped between the end hook 90' and block 91' and is held by that surface of the cam while the clips are applied to the overlapped ends. Then, near the final rotative movement of the cams, 85—85', after attaching clips have been applied, as presently described, the roller 108 of cam lever 98 rides onto the "loosen" surface $b$—$c$ of cam 85 and shifts the grip bar 87 outwardly to free the initial end of the rope. At the same time the cam roller 108' of lever 98' rides upon the cam surface $g$—$a$ of cam 85' to pull the grip bar 87' inwardly, thereby to cause the rope to be severed between the hook 90' and the cutter 95'.

The subsequent wrapping operation would take place by a reverse operation of the ring gear with the initial end of the rope held by gripper 80'.

The clip applying operation takes place immediately after the end portions of the rope have been brought into overlapped relation, but prior to the ring gear coming to rest. It is desirable for easier application of clips that the overlapped portions of the rope be brought into close parallel relation and held in registry with the line of travel of the clip former and cutter slide bars presently to be described. The rope register slide for alining the overlapped rope ends are contained in the housing 61 and is actuated by the rotative action of shaft 63 in proper timing with the functional operation of the grip bars 87—87' and other mechanism associated therewith.

By reference to Figs. 6, 11 and 18, it will be observed that the shaft 63 is extended transversely through the housing 61, and that fixed thereon within the housing are cams 115—115' set in the same relative positions on the shaft. Each cam has lobes at diametrically opposite sides. Slidably mounted in guide slots in the housing transversely of and above the shaft 63, are rope register slide bars 116 and 116', each having a cam roller 117 mounted thereon to be engaged by its corresponding cam 115—115' to actuate the slide outwardly, as from the position shown in Fig. 19 to that of Fig. 20. Coiled springs 118—118' are contained in recesses 120 in the housing and bear against lugs 121 on the slides in a manner to return them inwardly from extended positions and to cause the cam rollers to follow their respective cams. A cover plate 122 overlies the housing and retains these slide bars in place.

Each of the rope register bars is forked or bifurcated at its forward end to provide a mouth converging inwardly to a recess 123; when the bars are retracted these recessed ends are just out of the line of travel of the rope while being wrapped about the package; however, the timing of the cams 115—115', relative to the movement of ring gear R, is such that, after the ends of the rope have been overlapped, both bars 116—116' are extended, thereby to embrace the overlapped ends within the end recesses 123 and thereby confine them in parallel relation within the limits of travel of the clip former bars, as is clearly disclosed in Figs. 21 and 21A. The bars 116—116' retract in accordance with movement provided for by design of the cams 115—115' as the clip former bars are advanced, as later described.

With the rope wrapped about the package and the ends brought into overlapped relation and held by the grip bars and alined by the rope register bars 116—116', the attaching clips are applied thereto. For the formation of clips there is provided two supply strips 125 of suitable band metal, threaded from a source of supply, not shown, into the housing 60, as clearly shown in Figs. 1 and 18. These strips pass through guide slots 130 in a plate 131 fixed to the front of the housing 60, then along guide grooves 132 in a plate 132a fixed to the bottom of housing 60, then turn upwardly along the inside of the inner wall of the housing 60 and finally pass through slots 150 in the cutter plate 92a set in the inner end wall of housing 60, as seen in Figs. 17 and 18; the strips coming at their ends, respectively, into abutment with the extended end portions 133—133' of a pair of clip former slide bars 134—134' that are slidably contained in horizontal guideways in the top frame 89.

These clip former bars 134—134' are parallel and in spaced relation, symmetrically located between the gripper bars and are adapted to be reciprocally actuated in unison by a link 140; this link being pivotally connected at one end to the bars by a pivot pin 141 through their outer ends, and at its other end being pivotally connected by a pivot 142 with a lever arm 143 fixed on a cross shaft 144 revolubly mounted in the housing 60 parallel with the shaft 62, as seen in Figs. 6, 11 and 18. The shaft 144 is oscillated by means of a cam 145 that is fixed on shaft 62 and which has lobes 145a and 145b at opposite sides adapted to contact with a cam roller 146 on a lever arm 147 fixed to shaft 144. The timing of cam 145 is such that it actuates the shaft 144 immediately following the alining of the overlapped ends of the rope, to shift the bars 134—134' inwardly, thereby to form and apply the clips to the rope to secure the rope band about the bundle; the movement of the bars being indicated by the dotted line position in Fig. 18.

By reference to Figs. 18 and 21A, it is observed that the ends of the metal bands 125 from which clips are to be formed extend upwardly through the guide slots 150 in the inner face of the plate 92a secured to the housing 60 and in which plate are slots whereby the ends of the clip former bars are guided. It is also observed that the bars are formed with end recesses 151 between the extended portions 133 at their top edges and extensions 152 of lesser extent at their lower edges. The extended portions of each bar form a mouth therein with inwardly inclined surfaces, converging into the recess 151 which has a vertical base-wall 153 merging in rounded corners 154 into horizontal top and bottom edges 155—156.

When the metal bands 125 are fed into the machine, their inner ends pass through the guide slots 150 of plate 92a and are brought solidly against the extensions 133—133' of the bars 134—134', then, after the rope register bars 116—116' have advanced and the overlapped portions of the binding rope have been alined within their end recesses 123, the bars 134—134' are advanced through the successive positions shown in Figs. 21A to Fig. 25A, first, to shear off the short lengths of band, to form the two clips and clinch them about the ends of the rope.

It will be apparent by reference to Figs. 12 and 22A that, as the bars 134—134' advance, the shearing edges of the lower extensions 152 coact with the edges of the slots 150 to shear off the upper ends of the bands 125. These sheared off lengths 158 are held in place, each by a pair of clip former levers 160—160' which are disposed horizontally at opposite sides of the ends of the bars 134—134', and are pivotally mounted medially of their ends by pivot studs 162 fixed in the top frame 89. At the forward ends of the paired levers associated with each cutter slide bar are laterally directed ears 163 which have beveled inner surfaces facing toward the end recess 151 of the bar with which they are associated and engaging with opposite side edges of the cut off length of band from which the clip is to be formed. At the other ends of these paired levers, are inwardly extending ears 164 which engage with the opposite side surfaces of their corresponding clip former bars to prevent spreading of the forward ends, thus to grip the clips. Then, as the clip former bars 134—134' are shifted forwardly, successively through the positions shown in Figs. 22A and 23A, the clips, by reason of the levers 160—160' remaining stationary, are forced into the end recesses 151 of the bars. This causes the upper and lower end portions of the clip blanks 158 to be bent forwardly, as in Fig. 23A, to partially form the clips. Incidentally, the rope register bars 116—116' at the opposite side have at this time been extended and the overlapped portions of rope are thereby disposed within the partially formed clips, as shown in Fig. 23A.

When the former bars 134—134' are advanced to the position of Fig. 23A, the ears 164 at the inner ends of the clip former levers pass into slots 168 which extend through the bars, and the forward ends of the levers are thereby permitted to open apart, thus permitting a farther advancement of the bars 134—134'.

Mounted in the vertical wall of the housing 61 adjacent the rope passing slot of the table top and directly opposite the clip former bars, are forming anvils 170—170'. These anvils extend to equal length toward the ends of the bars 134—134' and in direct alinement with their travel. The outer ends of these anvils are adapted to be received within the mouths of the recesses of bars 134—134', as the latter are extended, and each anvil has upper and lower edge guides 171 with guide surfaces 171' inclined inwardly to a flat, vertical base 172. Thus, as the bars 134—134' are advanced with the partially formed clips therein, as seen in Fig. 23A, the inwardly bent end portions of the clips are brought against the inwardly rounded guide surfaces 171' of the corresponding anvils and are bent toward each other, thus to close the clip about the overlapped ends of the rope contained therein. The final forward travel of the bars 134—134' clinches these ends and flattens the clip loops, as shown in Fig. 25A.

During the advance movements of the bars 134—134' from the position of Figs. 23A to 24A, the rope registry bars 116—116' are retracted to initial position.

After clinching of the clips, the bars 134—134' are retracted and the clips are stripped from within their end recesses by contact with the inwardly directed ears 163 of the clip former levers. It will be observed by reference to Fig. 23, that at the ends of the lateral ears are slight projections 175. Also, it will be observed that horizontal slots 176 are provided in the opposite faces of the bars leading into the recesses 151. When the bars are fully extended, the levers 160—160' assume the relative position of Fig. 20, outside the limits of the formed clips, but on initial retractive movement of the bars, the rearward end portions of the levers, engaged by the forward wall of the slide recesses 168, will be actuated outwardly, thereby causing their forward ends to swing inwardly, placing the ear extensions 175 in the slots 176 to thereby come into abutment with the clips in a manner to cause them to be stripped from the bar recesses 151.

The means provided for the automatic feeding of the metal strips 125 into the machine is best illustrated in Fig. 18 wherein it will be observed that there are downwardly depending arms 190 pivotally mounted on the cross shaft 99 above each strip as it passes into the housing 60, and the lower ends of these arms are forked to form recesses through which the strips 125 pass. Pivotally mounted in the fork of each arm is a clutch roller 191, rotatably supported therein by an eccentric pivot pin 192. Coiled springs 193 are attached to the forward end of the guide plate, as in Fig. 11, and to these rollers, in a manner to cause them, by reason of their eccentric mountings, to automatically grip their respective bands 125 for advancement inwardly but to slide thereon when the arms 190 swing outwardly.

Also, pivotally mounted on the shaft 99 between the arms 190 is a feed lever 195 mounting a cam roller 196 and formed also with a downward leg 197 with lateral extensions 197', adapted to engage the lever arms 190 to swing the latter outwardly against the inward tension of springs 193. The cam roller 196 is positioned to be contacted and actuated by the lobes of cam 145, thus, with each one-half turn of the shaft 62, and while the bars 134—134' are extended, the cam 145 actuates the lever 195 and this in turn actuates the lever arms 190 outwardly, as to the full line position of Fig. 18, then, the springs pull them inwardly to the dotted line position, thereby through the clutch action of rollers 191 to advance the strips into end abutment with the extensions 133 of the clip forming bars. The strips are held against outward slippage while the clutches are moving outwardly by gripper spring plates 198 which are fixed in the recesses 130 of plate 131 to bear thereagainst and to effect a wedging action should the strips move outwardly.

Without going into a detailed description of the devices for starting an operation and for automatically stopping the machine when it is completed, it will here be stated that assuming the machine to be idling and the clutch element 37 in the driving sprocket drum 36 to be disengaged, an operation is started by depressing a foot pedal 200, seen in Fig. 7, fixed on a rock shaft 201. An arm 202 on the shaft is connected by a link 203 with an arm 204 on a clutch actuating rock shaft 205. A lever arm 206 on shaft 205 actuates a clutch spool 207 along shaft 33 to release or set the clutch element 37 and at the same time operates through a connecting link 209 and bell crank lever 210, as shown in Fig. 5, to set or release a brake band 211 applied to a brake drum 212 on shaft 33. The arrangement is such that depression of the foot pedal 200 sets the clutch to start operation simultaneously with release of the brake.

For automatically stopping the machine at the end of each operation, a trip lever 215 is fixed to the shaft 205, as shown in Fig. 7, in position to be engaged by lugs on the cam 66 to rock the shaft 205, thereby to actuate the clutch release shaft 205.

Briefly described, the sequence of operations is as follows:

First assume the ring gear R to be in the position of Fig. 26 and ready for an operation which will cause it to rotate in a counterclockwise direction. The bundle B to be wrapped is placed in position on the table. The operator presses in foot pedal 200 and thereby sets the machine in motion. The rope 6, held at one end in gripper G is carried about the bundle or package, through the successive positions of Figs. 26 to 29, and brought into overlapped relation and applied to gripper G². The rope registering slides 116—116' then advance to hold the rope ends in close relation within the line of travel of the clip applying devices; the clip forming bars 134—134' are then advanced and the clips cut and formed about the rope ends to secure the band about the bundle. Finally the grip bar G releases and the opposite bar G² operates to cut the rope to release the bundle but to retain its hold on the rope end leading to the supply. The clutch is then automatically disengaged and the machine stopped with ring gear R in the position of Fig. 29.

The next operation is started by the operator pressing on foot pedal 200, but the direction of rotation of the ring gear R is now clockwise and it carries the rope held at its end in gripper G² about the bundle and again brings the ends into overlapped relation and applies the secondary end to gripper G. Following this the clip applying operation is like that previously described and the operation is completed with the releasing of the drive clutch.

Having thus described my invention, what I claim as new therein and desire to secure by Letters Patent is—

1. In a bundle binding machine having a bundle support, a pair of stationary grippers in spaced relation, and a rope carrier member revoluble about an object on said support, and reversible for successive operations, for laying a rope band, held at its primary end by one of said grippers, progressively and under tension about the object to apply the secondary end portion of the band to the other gripper overlapped with the primary end portion between the grippers; means operable following successive operations of the carrier for applying a holding clip to the overlapped portions of the band, means alternately operable, following successive functional operations of the clip applying means, for releasing the gripper which holds the primary end of the rope band and means alternately operable to cut the secondary end portion of the band between its gripper and the applied clip.

2. In a bundle binding machine of that kind having means for laying a rope band about a bundle under tension to bring opposite end portions thereof into overlapped relation parallel with a face of the bundle, means for guiding a supply strip of clip forming stock, means for intermittently feeding the stock into the machine, and means for severing clip lengths therefrom and for bending said lengths into U-shaped clips and for applying and for causing them to be clinched about said overlapped ends of the band.

3. In a bundle binding machine comprising a stationary gripper for holding the primary end of a rope band and means for laying the rope while so held under tension about a bundle to bring its secondary end portion into overlapped relation with its primary end portion, and a gripper for receiving and holding the secondary end portion of the band; means for advancing a strip of clip forming stock, and movable means, operating automatically and in timing with the rope laying means for severing individual sections from the strip and forming them into holding clips and applying them about the overlapped portions of the band.

4. In a bundle binding machine having a bundle support, a pair of grippers in spaced relation, and a rope carrier member revoluble about an object on said support and reversible for successive operations for laying a rope band, held at its primary end by one of said grippers, progressively and under tension about the object to apply the secondary end portion of the band to the other gripper overlapped with the primary end portion between the grippers; means for holding a strip of clip forming stock, and means operating in timing with the rope carrier member to form a piece of said stock into a holding clip and for applying and clinching the clip to the overlapped end portions of the rope band while held under tension.

5. In a bundle binding machine having a bundle support, a pair of grippers in spaced relation, and a rope carrier member revoluble about an object on said support and reversible for successive operations for laying a rope band, held at its primary end by one of said grippers, progressively and under tension about the object to apply the secondary end portion of the band to the other gripper overlapped with the primary end portion between the grippers; means operating in timing with the rope carrier for feeding a strip of clip forming stock into the machine, means operable to form a clip from the stock, and to apply it to the overlapped end portions of the rope held under tension between the grippers, and means alternately acting for severing the secondary end of the rope between its gripper and the applied clip.

6. In a bundle binding machine having a bundle support, a pair of grippers in spaced relation, and a rope carrier member revoluble about an object on said support and reversible for successive operations for laying a rope band, held at its primary end by one of said grippers, progressively and under tension about the object to apply the secondary end portion of the band to the other gripper overlapped with the primary end portion between the grippers; means operable while the band is thus held under tension by the grippers to apply a plurality of holding clips to the overlapped end portions to secure them together, and means alternately operable after successive operations of the rope carrier to sever the secondary end portion of the rope band at a point between its gripper and the applied clips, and for effecting release only of the gripper that held the primary end of the rope band for the preceding operation.

7. In a bundle binding machine having a bundle support, a pair of grippers in spaced relation, and a rope carrier member revoluble about an object on said support and reversible for successive operations for laying a rope band, held at its primary end by one of said grippers, progressively and under tension about the object to apply the secondary end portion of the band to the other gripper overlapped with the primary end portion between the grippers; means operable to engage the overlapped portions of the band to move them closely together, and means operating in timing with the rope carrier for applying a plurality of holding clips to the overlapped portions of the band while held under tension, whereby each clip supplements the holding function of the other.

8. In a bundle binding machine having a bundle support, a pair of grippers in spaced relation, and a rope carrier member revoluble about an object on said support and reversible for successive operations for laying a rope band, held at its primary end by one of said grippers, progressively and under tension about the object to apply the secondary end portion of the band to the other gripper overlapped with the primary end portion between the grippers; means timed with movement of the rope carrier for advancing clip forming stock into the machine, a slide operable with each binding operation to cut a length from the stock and to form it into a clip and to apply it about the overlapped portions of rope, means arranged to co-act with the slide to clinch the clip about the rope ends, means for severing the secondary end of the rope after each clip applying operation at a point between its gripper and the applied clip, and means for effecting a release action of the gripper that held the primary end of the rope.

9. In a bundle binding machine having a bundle support, a gripper for holding the end of a rope, rope carrier means operable in reverse directions for successive operations for drawing off rope from a supply, and for laying it progressively from its gripped end under tension slightly more than once about the bundle to bring opposite end portions into overlapped relation and a second gripper spaced in the direction of wrapping from the first to receive and hold the secondary end of the band; means movable to a position to engage the overlapped portions of rope to move them into close relation, means for feeding a plurality of strips of clip forming stock into the machine, a forming slide for each strip operable by an advance movement to cut a short length of material from its strip and to bend it into U-shape and to apply it about the overlapped portions of rope, means co-acting with each slide in its final movement to clinch the clip about the said rope ends to secure them together, and means operable on successive binding operations to effect release only of the gripper that held the initial end of the rope for the preceding operation and to cut the secondary end of the band at a point between the gripper and the adjacent holding clip.

10. A combination with the means for holding the primary end of a rope extended from a supply, and means for laying a band thereof progressively from its held end about a bundle, of a gripper for receiving a secondary portion of the rope comprising a movable jaw, a yieldable gripper element and a fixed cutter opposedly related to the movable jaw, and means for actuating the movable jaw an initial distance toward the yieldable element to grip the rope between them, and an additional distance to depress the yieldable jaw and to sever the rope by pressing it against the cutter.

11. A device as recited in claim 10, wherein the cutter is at the inside of the yieldable element with reference to the bundle encircling band and provides for release of the bundle without release of the rope extended from the supply.

12. In a bundle binding machine having a bundle support, and a rope carrier member for laying a rope band under tension about a bundle located on the support; means for holding the primary end of the rope band during the binding operation, a gripper for receiving and holding the secondary end of the band when overlapped with the primary end portion, and means for applying a holding clip to the overlapped end portions of the band, the said gripper comprising a movable gripping jaw, a yieldable gripping member coacting therewith and adapted to hold the rope end between them without yielding, means for actuating the gripper jaw to effect yielding of the said gripping member, and a cutter arranged to coact with the gripping jaw incident to the said yielding to sever the rope end at a point between the yieldable gripping member and the applied clip without release of the rope end by the gripper.

13. In a bundle binding machine having a bundle support, and a rotatable rope carrier member for laying a rope band under tension about a bundle on said support, and reversible in direction of rotation for successive binding operations; a gripper for holding the primary end of a rope band during the binding operation, a gripper for receiving and holding the secondary end portion of the band overlapped with the primary end portion, and means for applying a holding clip to the overlapped portion between the grippers, each of said grippers comprising a movable gripping jaw, a yieldable gripping member coacting therewith adapted to hold the rope end between them without yielding, means operable after each clip applying operation for actuating the movable jaw of the gripper holding the secondary end of the band to effect yielding of the associated yieldable jaw, and a cutter arranged to coact with the actuated gripping jaw to sever the rope end at a point between the gripper and the applied clip without release of the rope end from the gripper.

14. A device as recited in claim 13, including means operable following the application of the holding clip to the overlapped ends to effect the release of the gripper holding the primary end of the rope band.

15. In a bundle binding machine having means for placing a rope band about a bundle with opposite ends of the band in overlapped relation; means for applying a holding clip to said overlapped ends of the band comprising means for holding a strip of clip forming stock, a clip forming and cut-off slide formed with a recess opening in the end thereof, means for advancing the slide against the strip to shear a clip from a portion therefrom, means cooperating with the advancing slide to cause said cut off portion to be bent into the slide recess into U shape for application by the advancing slide about the overlapped rope ends, and means coacting with the slide to cause the clip to be clinched about the rope ends.

16. In a bundle binding machine having means for placing a rope band about a bundle with its opposite end portions in overlapped relation; means for applying a holding clip to the overlapped ends of the band comprising a clip forming and cut-off slide having a recess opening in the end thereof, means for advancing a strip of clip forming stock across the mouth of the recess, means for advancing the slide against the stock to shear off a clip forming portion, releasable stops engageable with the cut off portion of stock to cause it to be bent into "U" shape within the slide recess incident to a continued advancement of the slide, and subsequently to be applied about the rope ends, and an anvil coacting with the advancing slide for clinching the clip ends about the overlapped rope ends.

17. In a machine of the character described having means for placing a rope band about a bundle with opposite end portions thereof in overlapped relation; a movably mounted slide having an end recess and formed with a shearing edge at one side of the recess, means for advancing a strip of clip forming stock across the shearing edge and mouth of the recess, means for advancing the slide against the strip to shear off that portion that extends across the recess, means controlled by the movement of the slide for temporarily holding the severed portion of the strip against advancement with the slide thereby to cause it to be pulled into the recess and bent into U shape for application by the slide about the overlapped rope ends, and an anvil disposed in the path of travel of the slide having portions against which the clipped ends will engage, thereby to be closed and clinched about the rope ends, and means for retracting the slide.

18. A device as in claim 17, wherein the means provided for holding the severed portion of the strip against advancement and for causing it to be pulled into the recess operates incident to retraction of the slide to strip the clip from the slide recess.

19. In a machine of the character described having means for placing a rope band about a bundle with opposite end portions thereof in overlapped relation; a movably mounted slide having an end recess, and formed at one edge of the recess with a shearing edge and at the opposite side having an extended stop portion, yieldable means for urging a strip of clip forming stock across the shearing edge of the recess and against the stop portion, means for advancing the slide against the strip to shear off that portion across the recess, stop devices for holding the severed portion of the strip against advancement with the slide thereby to cause it to be pulled into the recess and bent into U shaped form, said stops being releasable for application of the clip to the rope ends, and an anvil disposed to coact with the slide to clinch the clip about the rope ends.

20. A device as in claim 19, including a slide operating in timing with the clip applying slide and having an end recess adapted to receive the overlapped ends of the rope therein to place them in close relation for reception of the U shaped clip.

21. A device as in claim 19, including a slide operating in timing with the clip applying slide and having an end recess adapted to receive the overlapped ends of the rope therein to place them in close relation for reception of the U shaped clip, said slide being movable toward the rope ends for receiving them within the end recess prior to the application of the clip, and then adapted to be retracted in accordance with advancement of the clip applying slide for the clinching operation.

22. In a machine of the character described, including means for placing a binding rope about a bundle with opposite ends in overlapped relation; means for applying a holding clip to the said rope ends comprising an anvil, a clip forming slide having an end recess, means for holding a strip of clip forming stock, means for advancing the slide against said strip to shear off a clip forming length across the end recess, and a pair of levers pivotally mounted at opposite sides of the slide, and having ends formed with cam surfaces engaged by the slide to hold their opposite ends engaged with the clip during a portion of the forward travel of the slide toward the anvil, thereby to cause the clip to be bent into U shaped form within the recess, then to be released for advancement with the slide about the rope ends, and finally against the anvil for clinching.

23. In a machine of the character described, including means for placing a binding rope about a bundle with opposite ends in overlapped relation; means for applying a holding clip to the said rope ends comprising an anvil, a clip forming slide having an end recess, means for holding a strip of clip forming stock, means for advancing the slide against said strip to shear off a clip forming length across the end recess, and a pair of levers pivotally mounted at opposite sides of the slide, and having ends formed with cam surfaces engaged by the slide to hold their opposite ends engaged with the clip during a portion of the forward travel of the slide toward the anvil, thereby to cause the clip to be bent into U shaped form within the recess, then to be released for advancement with the slide about the rope ends, and finally against the anvil for clinching, and other cam surfaces on the levers whereby on retraction of the slide, the clip holding ends are caused to abut with the clip in a manner to strip it from the slide recess.

24. In a machine of the character described having means for placing a rope band about a bundle with its ends in overlapped relation; a clip forming slide operable on advance movements to cut a length of material from a strip of clip forming stock and to apply it about the rope ends, and means for feeding a strip of clip forming stock into the machine comprising an oscillating arm positively moved in one direction in timing with the cut-off slide, and having a clutch dog for engaging the strip, and a spring for actuating the dog into holding relation, and for urging the strip into the machine incident to retractive movements of the clip forming slide.

25. In a bundle binding machine, of that kind having two spaced, stationary grippers and a rotary means reversible for successive operations, operable to draw, from a supply, a length of rope held at its primary end in one gripper and lay a band thereof, under tension and progressively from the gripped end, about a bundle and to apply it to the other gripper overlapped with a primary end portion between the grippers; means automatically operable, after each band laying operation, to apply a holding clip to the overlapped portions, a cutter associated with each gripper, and means alternately operable for successive binding operations to open the gripper holding the primary end of the rope, and to actuate the rope cutting means associated with the other gripper to sever the rope at a point between the applied clip and gripper with the release of that end of the rope.

26. In a binding machine of that kind wherein, for successive binding operations, spaced stationary grippers are alternately operable, to hold the primary end of a rope band, and a reversible rotary carrier is operable in opposite directions to lay the rope band, while held by one gripper, under tension about a bundle and to apply its secondary end portion to the other gripper overlapped with the primary end portion; means automatically operable to apply a holding clip to the said overlapped portions to secure the band about the bundle, means for severing the rope at a point between the clip and second gripper and means for actuating the first gripper to open position while the second gripper retains its hold for the next operation.

27. In a binding machine of that kind wherein, for successive binding operations, spaced stationary grippers are alternately operable, to hold the primary end of a rope band, and a reversible rotary carrier is operable in opposite directions to lay the rope band, while held by one gripper, under tension about a bundle and to apply its secondary end portion to the other gripper overlapped with the primary end portion; means operable to form and then apply a holding clip about the overlapped end portions to secure the band about the bundle, means for severing the rope at a point between the clip and second gripper and means for opening the gripper holding the primary end.

CHARLES E. EVANS.